United States Patent
Kitten (12)

(10) Patent No.: US 6,335,308 B1
(45) Date of Patent: Jan. 1, 2002

(54) SUGAR MOBILIZING AND INSECT COMBATTING FERTILIZER COMPOSITION AND USE

(76) Inventor: Jerry Kitten, Rte. 2, Box 6, Slaton, TX (US) 79364

( * ) Notice: Subject to any disclaimer, the term of this patent is extended or adjusted under 35 U.S.C. 154(b) by 0 days.

(21) Appl. No.: 09/537,094

(22) Filed: Mar. 29, 2000

(51) Int. Cl.⁷ .................................................. C05G 3/00
(52) U.S. Cl. .............................. 504/101; 71/24; 424/646; 424/660; 424/677; 424/722; 424/DIG. 10
(58) Field of Search ................................ 504/101; 71/24; 424/646, 660, 677, 722, DIG. 10

(56) References Cited

U.S. PATENT DOCUMENTS

| | | | |
|---|---|---|---|
| 4,069,034 A | 1/1978 | Hoover | 71/33 |
| 4,666,497 A * | 5/1987 | Tenzer | 71/6 |
| 6,051,043 A * | 4/2000 | Kitten | 71/24 |
| 6,083,293 A * | 7/2000 | Bath | 71/16 |

* cited by examiner

*Primary Examiner*—S. Mark Clardy
(74) *Attorney, Agent, or Firm*—Jacobson Holman, PLLC

(57) ABSTRACT

A fertilizer composition, prepared by further diluting an aqueous concentrate and containing an admixture prepared from calcium, potassium, iron, boron and humic acid, when applied to sugar-containing plant leaves infested with sugar-eating, slow-moving, soft-bodied insects, decreases the sugar concentration in such leaves sufficiently to discourage such insects and effectively to rid such leaves of those insects.

18 Claims, No Drawings

SUGAR MOBILIZING AND INSECT COMBATTING FERTILIZER COMPOSITION AND USE

RELATED APPLICATION

This application is directed to subject matter related to that of application Ser. No. 08/149,766 (now U. S. Pat. No. 6,051,043), filed on Nov. 10, 1993.

FIELD OF THE INVENTION

Humic-acid-containing aqueous fertilizer compositions, sprayed on plant leaves which have a sugar concentration which attracts and supports certain insects, significantly decreases the sugar concentration in the plant leaves, which discourages or eliminates infestation of the plants by such insects.

BACKGROUND

The essential fertilizer components, humic acid, potassium, calcium and boron, have all been used in fertilizer compositions. Some of these components are shown, e.g., by Hoover (U.S. Pat. No. 4,069,034). A single company, Stoller, Inc., manufactures or provides two products, Charge™ and Sett™, which are regarded individually as fertilizer components. Charge™ is characterized as a humic acid concentrate manufactured by a patented process which extract humic acid directly from undecomposed peat naturally without use of caustic chemical processes. The active ingredients are stated to be humic and related acids (15% in aqueous formulations and 70% in powder formulations).

Sett™ is designed to be sprayed on plant foliage to reduce localized ethylene production within the plant. It is also supposed to guard against calcium replacement in cell walls and to increase fruit, boll, pod, or bud set. It is a foliar nutritional for reduced shedding which comprises 8% calcium and 1% boron, derived from calcium sucrose and sodium borate.

SUMMARY OF THE INVENTION

An aqueous and sprayable fertilizer composition comprising humic acid in combination with potassium, iron, calcium and boron, when sprayed on plant leaves, which have a sugar concentration which attracts and supports slow-moving, soft-bodied insects, aids in growth and health of the plant and significantly decreases the sugar concentration in the plant leaves.

An object of the invention is to provide a fertilizer composition which is capable of altering the sugar concentration in sugar-containing plant leaves when sprayed on such leaves. A further object of the invention is to provide a composition for combatting infestation on sugar-containing plant leaves of sugar-eating, slow-moving, soft-bodied insects by applying a liquid fertilizer to such leaves. A still further object of the invention is to move sugar from sugar-containing plant leaves to fruit of the plant by applying an aqueous fertilizer composition to the plant leaves.

DETAILS

Ordinary fertilizers contain, e.g., nitrogen, phosphorus, potassium, calcium, iron and trace elements, such as boron. Combining humic acid with potassium, iron, calcium and boron in suitable proportions in an aqueous sprayable fertilizer composition provides a formulation which, when sprayed on plant leaves which have a sugar concentration which attracts and supports slow-moving, soft-bodied insects, not only aids in the growth and health of the plant but also significantly decreases the sugar concentration in the plant leaves. This discourages infestation by the sugar-eating, slow-moving, soft-bodied insects, such as aphids, which feed on such leaves. Applying the aqueous fertilizer composition to the leaves, while they are infested with the insects, eliminates the noted detrimental insects by removing or adequately decreasing the concentration of that which attracts such insects.

The aqueous fertilizer compositions are advantageously prepared by admixing together (by weight) from about 2.62 to about 3.20 (preferably about 2.91) parts of potassium, from 0.90 to 1.10 (preferably about 1.00) part of iron, from 3.16 to 3.86 (preferably about 3.51) parts of calcium, from 0.38 to 0.46 (preferably about 0.42) part of boron, from 1.55 to 3.61 (preferably about 2.58) parts of humic acid. The relative amounts are thus about 1.125 parts of potassium, about 0.386 part of iron, about 1.309 parts of calcium, and about 0.164 part of boron per part of humic acid, with such parts being parts by weight. These essential components are advantageously mixed with a base of inert ingredients, although other active fertilizer components can also be incorporated in the aqueous fertilizer compositions. The essential elements are combined in liquid form in, preferably, stainless steel vats or other suitable containers which do not deteriorate when exposed to humic acid.

The noted essential components (humic acid, potassium, iron, calcium and boron) are mixed with water to produce a concentrate, which is further diluted to a sprayable composition which is applied by ground or air spraying, as is common with liquid fertilizers currently used.

Humic acid is actually a generic term. For this disclosure that term is limited to the humic and related acids of the type referred to in the characterization of the active ingredients in Charge™. The humic and related acids are, e.g., those obtained according to the disclosure of U.S. Pat. No. 4,459,159. This humic acid is directly extracted from undecomposed peat naturally and without use of caustic chemical processes. The humic acid is limited to that which, in combination with suitable proportions of potassium, iron, calcium and boron, is capable of significantly altering the sugar concentration of sugar-containing plant leaves on which it is applied.

The term "significantly", as used in connection with decreasing the sugar concentration in sugar-containing plant leaves, refers to a degree of change in concentration sufficient to discourage the sugar-eating, slow-moving, soft-bodied insects sufficiently so that they will stop foraging on the involved plant leaves.

When applied to plant leaves which have a sugar concentration which attracts and supports sugar-eating, slow-moving, soft-bodied insects, the aqueous fertilizer compositions significantly decrease the sugar concentration in the plant leaves. By so doing, the composition is effective in combatting the sugar-eating, slow-moving, soft-bodied insects, such as aphids (e.g., green bugs), white fly larvae and spider mites, which feed on the sugar content found in the leaves of many plants, such as cotton, sorghum, watermelon, cantaloupe, tomato, black-eyed peas, green beans, okra and grapes. Plants, which are doing poorly, produce more sugars than they are able to process. As a result, the excess sugar attracts aphids and other soft-bodied, slow-moving insects. Although ordinary fertilizers can help strengthen the plants so that the excess sugar level is decreased, that process is slow and normally unsuccessful before the leaves are already infested with or destroyed by the insects. The humic acid in the subject compositions mobilizes the sugar; the other critical ingredients (potassium, iron, calcium and boron) act as a catalyst to decrease the sugar concentration in the leaves. For numerous plants, the sugar is moved from the leaves to the fruit. Without an appropriate sugar concentration in the leaves, the insects no longer have an interest in the plant. Consequently, the sugar-eating, slow-moving, soft-bodied insects abandon the plant to look elsewhere for food. However, because they are slow moving, they often starve to death before finding food. Being rid of the insects, the plant then has time to regain its health and break down the normally-produced sugars. The composition works to rid the plant of insects and to strengthen the plant while also saving beneficial insects. The beneficial insects help to control any remaining aphids, as well as other fruit-eating insects.

Suitable aqueous compositions can be prepared by virtually any established means of combining the required components. The resulting blend is suitably diluted with various amounts of water just prior to foliar application. The amount of water added depends on the size and type of crop to be treated. Also, other fertilizer components can be incorporated in the formulation, as desired. Other trace elements improve the obtained results by furnishing catalysts suitable for forming plant enzymes.

To be effective for the noted purpose, the subject compositions are applied to plant leaves while the leaves are infested with the sugar-eating, slow-moving, soft-bodied insects.

The stated essential components other than humic acid, i.e., potassium, iron, calcium and boron, are optionally in any form commonly used in fertilizer compositions.

Throughout the disclosure and claims the term "about" or "approximate" includes ±5 percent. The expression "substantially the same as", means that the involved admixture has virtually the same ultimate composition (±5 percent) and has the stated effect on changing sugar concentration on leaves (±5 percent).

Although the actual parts by weight or parts by volume of each of the essential components may vary to some degree, the approximate relationship between the noted essential components which are combined to formulate the fertilizer compositions should be 29 parts by weight of potassium, 10 parts by weight of iron, 34 parts by weight of calcium and 4 parts by weight of boron for each 26 parts by weight of humic acid. The actual parts by weight of the respective essential ingredients admixed to prepare the fertilizer compositions can vary as previously indicated.

The humic acid acts in consort with the other essential components to alter the sugar concentration in sugar-containing leaves of plants sufficiently to reduce or eliminate infestation of such plants by the noted sugar-eating insects. The aqueous fertilizer compositions are thus capable of altering the sugar concentration in plant leaves to which the composition is applied. It is capable of assisting the transport of such sugar from the leaves to the fruit of such plants. It is also capable of exterminating sugar-eating insects or at least removing them from sugar-containing plant leaves.

The compositions are applied to plant leaves during the period when the leaves are normally infested with the noted insects.

EXAMPLE

An aqueous fertilizer concentrate composition is readily prepared by admixing 2 gallons of SETT™ with one gallon each of a) an aqueous potassium chloride solution having a density of 10.5 pounds per gallon and comprising 15 percent by weight of potassium, b) an aqueous chelated iron solution having a density of 10.8 pounds per gallon and comprising 5 percent by weight of iron, and c) a 20 percent aqueous solution of (powder-form) Charge™. (SETT™ has a density of 11.45 pounds per gallon and comprises 8 weight percent of calcium in the form of calcium sucrose and 1 weight percent of boron in the form of sodium borate. Charge™ is a dry powder having 70 weight percent of humic acid; a 20 percent aqueous solution thereof has a density of 10.0 pounds per gallon and 14 weight percent of humic acid.) The relative amounts of essential active components combined to produce the resulting admixture are indicated as optimum values in the following table.

TABLE

Essential Ingredients

|  | Parts by Weight | | | | Ultimate Weight Percent | | |
|---|---|---|---|---|---|---|---|
|  | mini-mum | opti-mum | maxi-mum | per part of humic acid | mini-mum | opti-mum | maxi-mum |
| Calcium | 3.04 | 3.38 | 3.72 | 1.309 | 1.196 | 1.329 | 1.462 |
| Potassium | 2.62 | 2.91 | 3.20 | 1.125 | 1.063 | 1.181 | 1.299 |
| Iron | 0.90 | 1.00 | 1.10 | 0.386 | 0.353 | 0.392 | 0.431 |
| Boron | 0.38 | 0.42 | 0.46 | 0.164 | 0.150 | 0.167 | 0.184 |
| Humic Acid | 1.55 | 2.58 | 3.61 | 1.000 | 0.612 | 1.017 | 1.422 |

Two gallons of water are combined with each gallon of the thus-prepared concentrate prior to spraying the thus-diluted (ultimate) admixture onto leaves of plants infested with sugar-eating, slow-moving, soft-bodied insects. The resulting optimum composition is that prepared by combining active components in amounts reflected in the table under ultimate optimum weight percent. The table also reflects suitable ranges for incorporating each active component in desired compositions.

The diluted (final) admixture is advantageously applied in amounts of from 5 to 10 (preferably 7.5) gallons per acre from ground sprayers whenever the subject insects are first noticed. This provides from 0.01 to 0.8 mg of solids per square inch of leaf surface. Best control is obtained when populations can be prevented from sudden, rapid build-ups. Spraying is preferably effected in bright sunlight in late morning to early afternoon and with minimal wind for best results.

Ordinarily, one treatment with thorough coverage of plants will reduce the noted insect population so dramatically that beneficial insects, such as lady beetles, can keep any remaining population under control.

The invention and its advantages are readily understood from the preceding description. Various changes may be made in the compositions and processes without departing from the spirit and scope of the invention or sacrificing its material advantages. The processes and compositions hereinbefore described are merely illustrative of preferred embodiments of the invention.

What is claimed is:

1. A fertilizer composition, useful a) for aiding growth and health of a plant, leaves of which have a sugar concentration which attracts and supports sugar-eating, slow-moving, soft-bodied insects and b) for combating the insects, wherein the fertilizer composition is substantially the same as an admixture of humic acid with potassium, iron, calcium and boron, each of which is incorporated therein in an effective amount, and the humic acid is of a type which is suitable, in the presence of an effective amount of potassium, iron, calcium and boron, to decrease significantly the sugar concentration in plant leaves on which said fertilizer composition is applied.

2. A fertilizer composition of claim 1 wherein, as incorporated in the admixture, the potassium is in the form of potassium chloride, the iron is in the form of chelated iron, the calcium is in the form of calcium sucrose, and the boron is in the form of sodium borate.

3. A fertilizer composition of claim 1 comprising, as combined ingredients, from 3.04 to 3.72 parts by weight of calcium, from 2.62 to 3.20 parts by weight of potassium, from 0.90 to 1.10 parts by weight of iron, from 0.38 to 0.46 part by weight of boron and from 1.55 to 3.61 parts by weight of humic acid.

4. A fertilizer composition of claim 3 comprising, as combined ingredients, about 3.38 parts by weight of calcium, about 2.91 parts by weight of potassium, about 1.0 part by weight of iron, about 0.42 part by weight of boron and about 2.58 parts by weight of humic acid.

5. A fertilizer composition of claim 1 which comprises, as combined ingredients, per part by weight of humic acid, about 1.309 parts by weight of calcium, about 1.125 parts by weight of potassium, about 0.386 part by weight of iron, and about 0.164 part by weight of boron.

6. A fertilizer composition aqueous concentrate which is substantially the same as one which is a combination of from 3.04 to 3.72 percent by weight of calcium, from 2.62 to 3.20 percent by weight of potassium, from 0.90 to 1.10 percent by weight of iron, from 0.38 to 0.46 percent by weight of boron and from 1.55 to 3.61 percent by weight of humic acid, and wherein the humic acid is of a type which is suitable, in the presence of an effective amount of potassium, iron, calcium and boron, to decrease significantly the sugar concentration in plant leaves on which said fertilizer composition is applied.

7. A fertilizer composition aqueous concentrate of claim 6 wherein, as incorporated in the composition, the potassium is in the form of potassium chloride, the iron is in the form of chelated iron, the calcium is in the form of calcium sucrose, and the boron is in the form of sodium borate.

8. An aqueous sprayable fertilizer composition which is an admixture of one part by volume of the concentrate of claim 6 with two parts by volume of water.

9. An aqueous sprayable fertilizer composition of claim 8 wherein, as incorporated in the composition, the potassium is in the form of potassium chloride, the iron is in the form of chelated iron, the calcium is in the form of calcium sucrose, and the boron is in the form of sodium borate.

10. A fertilizer composition of claim 8 wherein the sole essential combined components, in addition to water, are calcium, potassium, iron, boron and humic acid.

11. A fertilizer composition of claim 8 wherein the combined components comprise per part by weight of humic acid, about 1.31 parts by weight of calcium, about 1.125 parts by weight of potassium, about 0.386 part by weight of iron, and about 0.164 part by weight of boron.

12. A fertilizer composition of claim 8 wherein the combined ingredients comprise from 1.196 to 1.462 percent by weight of calcium, from 1.063 to 1.299 percent by weight of potassium, from 0.353 to 0.431 percent by weight of iron, from 0.150 to 0.184 percent by weight of boron, and from 0.612 to 1.422 percent by weight of humic acid.

13. A fertilizer composition of claim 8 wherein the combined components comprise about 1.329 weight percent of calcium, about 1.181 weight percent of potassium, about 0.392 weight percent of iron, about 0.167 weight percent of boron, and about 1.017 weight percent of humic acid.

14. A fertilizer composition which is an aqueous admixture of from 1.196 to 1.462 percent by weight of calcium, from 1.063 to 1.299 percent by weight potassium, from 0.353 to 0.431 percent by weight of iron, from 0.150 to 0.184 percent by weight of boron, and from 0.612 to 1.422 percent by weight of humic acid.

15. A method of preparing a fertilizer composition concentrate of claim 6 which comprises admixing together the following components:

a) 2 parts by volume of SETT™ (an aqueous composition weighing 11.45 pounds per gallon and having 8 percent by weight of calcium in the form of calcium sucrose and 1 percent by weight of boron in the form of sodium borate), b) 1 part by volume of an aqueous potassium chloride solution weighing 10.5 pounds per gallon and having 15 percent by weight of potassium, c) 1 part by volume of an aqueous chelated iron solution weighing 10.8 pounds per gallon and having 5 percent by weight of iron, and d) 1 part by volume of a 20 percent aqueous solution (weighing 10 pounds per gallon) of Charge™ (a dry powder comprising 70 percent by weight of humic acid).

16. A method of combating sugar-eating, slow-moving, soft-bodied insects which thrive on sugar-containing plant leaves, which comprises spraying on such leaves, while the leaves are infested with the insects, an effective amount of a fertilizer composition of claim 8.

17. A method of combating sugar-eating, slow-moving, soft-bodied insects which thrive on sugar-containing plant leaves, which comprises decreasing sugar concentration in such leaves sufficiently to discourage such insects by applying to the leaves an effective amount of a fertilizer composition of claim 8 while the leaves are infested with the insects.

18. A method of claim 16 wherein the insects are aphids.

* * * * *